(12) United States Patent
Nagayasu et al.

(10) Patent No.: US 9,233,654 B2
(45) Date of Patent: Jan. 12, 2016

(54) WIRE HARNESS ROUTING STRUCTURAL PART

(75) Inventors: Daiki Nagayasu, Mie (JP); Tsutomu Sakata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 120 days.

(21) Appl. No.: 14/009,949

(22) PCT Filed: Feb. 20, 2012

(86) PCT No.: PCT/JP2012/053912
§ 371 (c)(1),
(2), (4) Date: Oct. 4, 2013

(87) PCT Pub. No.: WO2013/008486
PCT Pub. Date: Jan. 17, 2013

(65) Prior Publication Data
US 2014/0020952 A1    Jan. 23, 2014

(30) Foreign Application Priority Data
Jul. 8, 2011    (JP) .................................. 2011-151759

(51) Int. Cl.
*B60R 16/02*    (2006.01)
*B60R 16/027*    (2006.01)
*H02G 11/00*    (2006.01)
(Continued)

(52) U.S. Cl.
CPC .......... *B60R 16/0215* (2013.01); *B60R 16/027* (2013.01); *H02G 11/00* (2013.01); *H02G 3/0468* (2013.01); *H02G 3/22* (2013.01); *H02G 3/32* (2013.01)

(58) Field of Classification Search
CPC ........... B60R 16/02; B60J 5/04; H02G 11/00; H02G 3/04

USPC ....................................................... 174/72 A
See application file for complete search history.

(56) References Cited

U.S. PATENT DOCUMENTS 5,957,702 A    9/1999  Nagai et al.
6,217,375 B1   4/2001  Nagai et al.
(Continued)

FOREIGN PATENT DOCUMENTS

JP     09-065542     3/1997
JP     10-181479     7/1998
(Continued)

OTHER PUBLICATIONS

Search report from International Search Report in PCT/2012/053912, mail date is May 22, 2012.

*Primary Examiner* — Timothy Thompson
*Assistant Examiner* — Michael F McAllister
(74) *Attorney, Agent, or Firm* — Greenblum & Bernstein, P.L.C.

(57) ABSTRACT

A wire harness routing structural part reduces the number of components for routing a wire harness within a door. The wire harness routing structural part includes a wire harness incorporating a main path wire and a different path wire, a portion of the wire harness being fixated to a body, and a protector placed on an interior of the door. The protector includes an accommodation part and a different path guide portion, the accommodation part having an extraction opening for extracting the wire harness to the interior of the door and accommodating the wire harness with a space enabling the wire harness to be redirected. The different path guide part guides the different path wire of the wire harness extracted through the extraction opening on a path different from that of the main path wire of the wire harness and following an outer surface of the accommodation part.

9 Claims, 9 Drawing Sheets

(51) Int. Cl.
*H05K 5/02* (2006.01)
*H05K 7/14* (2006.01)
*H02G 3/04* (2006.01)
*H02G 3/22* (2006.01)
*H02G 3/32* (2006.01)

(56) References Cited

U.S. PATENT DOCUMENTS 6,566,603 B2 *   5/2003   Doshita et al. .............. 174/72 A
6,668,865 B2 *  12/2003   Miyamoto et al. ............ 138/108
6,724,613 B2 *   4/2004   Doshita et al. ................ 307/10.1
7,910,832 B2 *   3/2011   Pieh et al. .................... 174/99 R
2006/0090920 A1* 5/2006   Fujita .......................... 174/72 A

FOREIGN PATENT DOCUMENTS

| | | |
|---|---|---|
| JP | 10-181481 | 7/1998 |
| JP | 2004-215450 | 7/2004 |
| JP | 2007-076620 | 3/2007 |

* cited by examiner (1)

WIRE HARNESS ROUTING STRUCTURAL PART

FIELD OF THE INVENTION

The present invention relates to a technology routing a wire harness between a body and a door.

BACKGROUND OF THE INVENTION

A wire harness is routed between a body and a door in order to supply electric power or transmit a signal to electrical devices and the like mounted in the door of an automobile, In Patent Literature 1, a routing structure is disclosed in which a door harness routed in a door is routed into a vehicle body panel. In the routing structure, a guide portion of a wire harness is provided to a door module panel of the door. The guide portion includes an access opening on a vehicle body-side end and, on a bottom end, an opening for extraction to a door interior. The guide portion also includes a straight line-shaped space for sliding having an access opening on a forefront end and a large-area extra length absorption space spanning from the space for sliding to the opening for extraction.

In addition to guiding the wire harness in a straight line with the space for sliding, extra length of the wire harness is accommodated in the extra length absorption space so as to be capable of displacement between a bent state and an inclined state.

RELATED ART

Patent Literature

Patent Literature 1: Japanese Patent Laid-open Publication No. 2007-76620

SUMMARY OF THE INVENTION

Problems to Be Solved by the Invention

The electrical devices mounted in the door of the automobile are positioned at various vertical locations within the door. For example, a motor for a door lock or the like is often provided in a comparatively higher position while a speaker or the like is often provided in a comparatively lower position.

In the routing structure of Patent Literature 1, the wire harness is extracted into the door interior through the extraction opening on the bottom end of the guide portion, and therefore is routed to the electrical devices located in higher positions in the door by detouring along an exterior side of the guide portion. The wire harness routed in this way, on a path directed in an orientation different from that of the extraction opening of the guide portion, may be fixated to the door by a member such as a clamp in order to inhibit swinging, or may be covered by a protective member in order to protect the wire harness from nearby members. According to such an aspect, there is a circumstance that a number of components for routing the wire harness within the door may increase.

Thus, the present invention has as an object to reduce the number of components for routing the wire harness within the door.

Means for Solving the Problems

A first aspect is the wire harness routing structural part routing a wire harness between a body and a door of a vehicle. The wire harness routing structural part includes the wire harness and a protector. The wire harness is formed such that a portion thereof is capable of fixating to the body and incorporates a main path wire and a different path wire routed on a path different from that of the main path wire. The protector is formed so as to enable placement on an interior of the door and includes an accommodation part and a different path guide part. The accommodation part includes an extraction opening for extraction of the wire harness to the interior of the door and accommodates the wire harness with a space enabling the wire harness to be redirected. The different path guide part guides the different path wire of the wire harness extracted through the extraction opening on a path following an outer surface of the accommodation part, the path being different from that of the main path wire of the wire harness. The different path wire is returned inside the extraction opening and positioned in the different path guide part, the different path wire being branched off from the main path wire in the wire harness extracted from the extraction opening and U-turned.

A second aspect is the wire harness routing structural part according to the first aspect, in which the different path guide part forms a path along a rear side of the accommodation part.

A third aspect is the wire harness routing structural part according to the first or second aspect, in which the accommodation part includes a path regulating wall capable of constraining a path to a path that bends the wire harness toward the extraction opening by abutting the wire harness, the wire harness being inserted into the interior of the accommodation part from the body side. In addition, the different path guide part is formed along an outer surface of the path regulating wall.

A fourth aspect is the wire harness routing structural part according to the first aspect, in which the different path guide part forms a path following a vehicle interior side of the accommodation part.

A fifth aspect is the wire harness routing structural part according to any one of the first to fourth aspects, in which the different path guide part includes a rib-shaped wall rising up with respect to the outer surface of the accommodation part.

A sixth aspect is the wire harness routing structural part according to any one of the first to fifth aspects, in which the protector is positioned on the interior of the door in an orientation where the extraction opening faces upwards. In addition, the different path guide part is formed in a shape guiding the different path wire on a path directed downward from the extraction opening.

A seventh aspect is the wire harness routing structural part according to any one of the first to sixth aspects, in which the protector is configured by assembling a recessed member and a lid-shaped member, and in which the different path guide part includes a trench-shaped portion formed on the recessed member.

An eighth aspect is the wire harness routing structural part according to the seventh aspect, in which the different path guide part includes a retention portion engaging with the different path wire installed in an interior of the trench-shaped portion.

Effect of the Invention

According to the wire harness routing structural part according to the first aspect, the wire harness routing structural part includes the wire harness and the protector. A portion of the wire harness is fixated to the body and the wire harness incorporates the main path wire and the different path wire. The protector is placed on the interior of the door and includes the accommodation part and the different path guide part. The accommodation part includes the extraction opening for extraction of the wire harness to the interior of the door and accommodates the wire harness with the space enabling the wire harness to be redirected. The different path guide part guides the different path wire of the wire harness extracted through the extraction opening on the path following the outer surface of the accommodation part, the path being different from that of the main path wire of the wire harness. The different path wire is returned inside the extraction opening and positioned in the different path guide part, the different path wire being branched off from the main path wire in the wire harness extracted from the extraction opening and U-turned. Therefore, members other than the protector such as a fixating member for fixating to the door or a protective member for protection from nearby members can be omitted for the different path wire of the wire harness, which is routed on the path different from that of the main path wire. The number of components for routing the wire harness within the door can thus be reduced.

According to the wire harness routing structural part according to the second aspect, the different path guide part forms a path along the rear side of the accommodation part. Therefore, an increase in dimensions of the protector in a vehicle interior-exterior direction of the door can be inhibited. The wire harness routing structural part according to the second aspect can thus be applied even in a case with strict restrictions on space in the vehicle interior-exterior direction of the accommodation part on the interior of the door.

According to the wire harness routing structural part according to the third aspect, the accommodation part includes the path regulating wall capable of constraining a path to the path that bends the wire harness toward the extraction opening by abutting the wire harness, the wire harness being inserted into the interior of the accommodation part from the body side. In addition, the different path guide part is formed along the outer surface of the path regulating wall. Therefore, an increase in the dimensions of the protector in the vehicle interior-exterior direction of the door can be inhibited, and the wire harness routing structural part according to the third aspect can be applied even in a case with strict restrictions on space on the vehicle interior-exterior sides of the accommodation part on the interior of the door.

According to the wire harness routing structural part according to the fourth aspect, the different path guide part forms the path following the vehicle interior side of the accommodation part. Therefore, an increase in the dimensions of the protector on the rear side of the door can be inhibited, and the wire harness routing structural part according to the fourth aspect can be applied even in a case with strict restrictions on space on the rear side of the accommodation part on the interior of the door.

According to the wire harness routing structural part according to the fifth aspect, the different path guide part includes the rib-shaped wall rising up with respect to the outer surface of the accommodation part, thus imparting an improvement in strength of the accommodation part.

Generally, the various electrical devices installed in the door are placed in positions on the upper side of the door. According to the wire harness routing structural part according to the sixth aspect, the protector is positioned on the interior of the door in an orientation where the extraction opening faces upwards. In addition, the different path guide part is formed in a shape guiding the different path wire on the path directed downward from the extraction opening. Therefore, the path of the main path wire is defined so as to be directed upward in the door where a comparatively large number of the electrical devices are located, and the path of the different path wire is defined so as to be directed downward in the door where a comparatively small number of the electrical devices are located. A wire harness routing path on the door interior can thus be made shorter.

According to the wire harness routing structural part according to the seventh aspect, the protector is configured by assembling the recessed member and the lid-shaped member, and the different path guide part includes the trench-shaped portion formed on the recessed member. Therefore, the wire harness can be positioned on the interior of the recessed member and the different path wire can be installed in the interior of the trench-shaped portion, the different path wire being branched off from the main path wire of the wire harness. In addition, simply by assembling the lid-shaped member with the recessed member in this state, the wire harness can be set within the protector and workability of assembling the protector can be improved.

According to the wire harness routing structural part according to the eighth aspect, the different path guide part includes the retention portion engaging with the different path wire installed in the interior of the trench-shaped portion. Therefore, the different path wire installed in the trench-shaped portion can be inhibited from falling out and the pair of members can be assembled more readily.

MODE FOR CARRYING OUT THE INVENTION

<First Embodiment>

Figure 1:
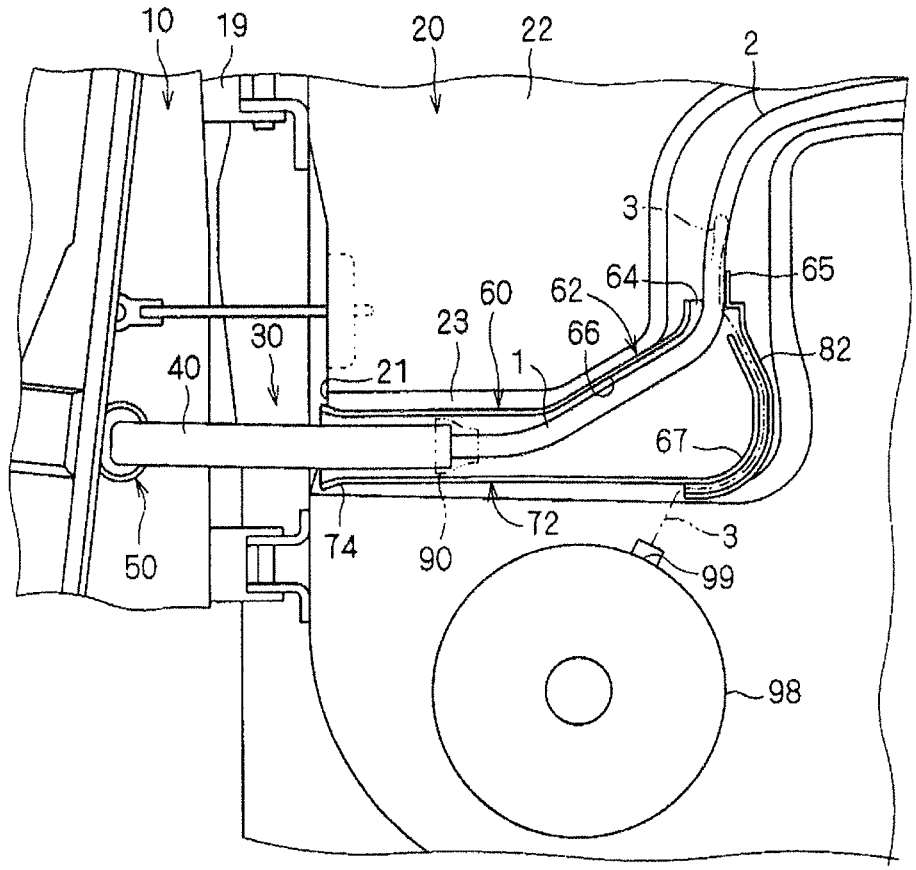
[FIG. 1] a schematic overall view of a wire harness routing structural part.

Hereafter, a description is given of a wire harness routing structural part 30 according to a first embodiment (see FIG. 1). The wire harness routing structural part 30 is configured to route a wire harness 1 between a body 10 and a door 20 of a vehicle.

The wire harness 1 to be routed is formed into a routing configuration by bundling a plurality of electric wires for supplying electric power or transmitting a signal to electrical devices installed in the door 20. Examples of the electrical devices installed in the door 20 include a speaker, a side mirror motor, a door lock motor, a power window motor, and various switches. Herein, a portion of the wire harness 1 bridging from the body 10 to the door 20 is configured by bundling a plurality of electric wires into one bundle. In addition, the wire harness 1 branches within the door 20 and is connected to the various electrical devices.

The wire harness 1 incorporates a main path wire 2 and a different path wire 3, which is routed on a path different from that of the main path wire 2. Specifically, of the wires branching within the door 20 and connected to the various electrical devices, the main path wire 2 is routed toward a main path directed toward a side where a comparatively large number of the electrical devices are located, while the different path wire 3 is routed toward a different path directed toward a side where a comparatively small number of the electrical devices are located. However, the main path wire 2 may also be configured by fewer wires than the different path wire 3. In other words, the terms "main path wire" and "different path wire" are given only for convenience to differentiate between wires routed on different paths.

In addition, because comparatively more electrical devices are generally placed in upper locations within the door 20, a description is given herein where a path directed upward is the main path and a path directed downward is the different path. For example, the main path wire 2 is a wire connected to electrical devices such as the side mirror motor, the door lock motor, the power window motor, and the various switches, while the different path wire 3 is a wire connected to electrical devices such as the speaker. Herein, an example is described in which the different path wire 3 is a wire connected to a speaker 98 (see FIG. 1).

For ease of description, the body 10 and the door 20 are now described. The body 10 is a portion configured by welding, for example, a frame and a panel formed with a metal material. A boarding entrance for boarding and disembarking the vehicle is formed on a side portion of the body 10. The door 20 is connected to the body 10 by a hinge 19 or the like so as to be capable of opening and closing the boarding entrance. More specifically, an end of the door 20 on a forward side of the vehicle when closed is connected to a front pillar (a site on an inner periphery of the boarding entrance of the body 10 and located on the forward side of the vehicle) so as to be capable of an open/close operation around a connection axis along a substantially vertical direction. In addition, the door 20 includes an inner door panel 22, an outer door panel not shown in the drawings, and door trim 26 (see FIGS. 2 and 3). The inner door panel 22 is a member formed by press molding or punching a metal plate. The outer door panel is an outer sheathing member provided on a vehicle exterior side of the inner door panel 22. In addition, the door trim 26 is formed by a synthetic resin material or the like and is an inner sheathing member attached to a vehicle interior side of the inner door panel 22. Hereafter, a description is given of the door 20 where a side to which the end is connected to the body 10 (forward side of the vehicle in the closed state) is forward and an opposite side (rearward side of the vehicle in the closed state) is rearward. In addition, for the door 20 and a portion of the wire harness routing structural part 30 located on the door 20, looking rearward from a forward side of the door 20 is treated as a front face and looking at the vehicle exterior side of the door from the vehicle interior side is treated as a lateral face.

The wire harness routing structural part 30 according to the present embodiment routes the wire harness 1 by inserting the wire harness 1 into the front pillar of the body 10 and, in addition, routes the wire harness 1 between the inner door panel 22 and the door trim 26 of the door 20. Therefore, a through-hole 11 for inserting and routing the wire harness 1 is formed on the front pillar (more specifically, on a metal plate of the front pillar having a surface on the inner peripheral side of the boarding entrance) of the body 10 (see FIGS. 2 and 3). In addition, an introduction opening 21 for passing the wire harness 1 between the inner door panel 22 and the door trim 26 is formed on the forward-side end of the door 20. Herein, the introduction opening 21 is formed by joining a forward-side terminal edge of a recess 23 and a forward-side terminal edge of the door trim 26 directly facing the recess 23, the recess 23 opening toward the vehicle interior and formed on the inner door panel 22. Moreover, the recess 23 is a portion chiefly accommodating a protector 60, described below, within the door 20 and includes an interior space capable of partially or entirely accommodating the protector 60.

The through-hole 11 of the body 10 and the introduction opening 21 of the door 20 are formed at opposing sites in the closed state of the door 20. Specifically, the through-hole 11 and the introduction opening 21 are set such that, in the closed state of the door 20, the wire harness 1 can be routed in a straight line or in a gentle curve between the body 10 and the door 20.

Figure 2:
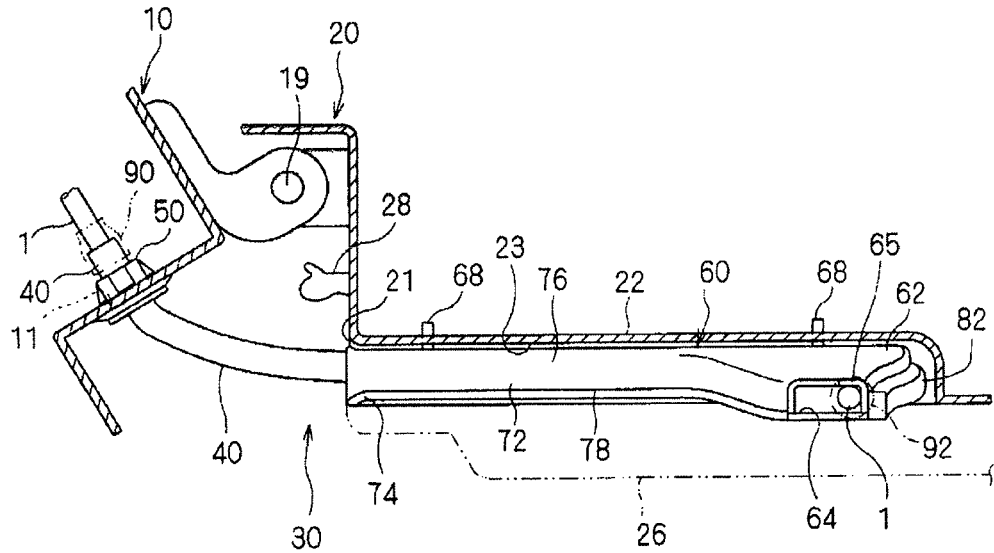
[FIG. 2] a plan view of the wire harness routing structural part in a state where a door is open.
Figure 3:
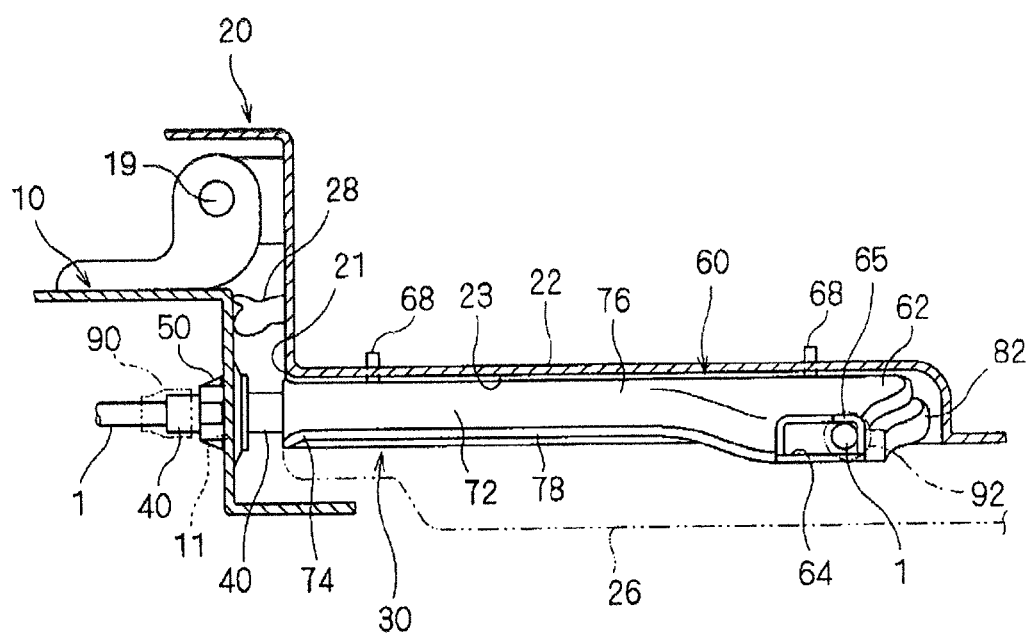
[FIG. 3] a plan view of the wire harness routing structural part in a state where the door is closed.

The door 20 also includes a weather strip 28 for waterproofing along a peripheral edge (see FIGS. 2 and 3). In the state where the door 20 is closed, the weather strip 28 is formed by a flexible material such as rubber which is capable of retaining a water-tight state on the vehicle interior and exterior by tightly adhering to the inner periphery of the boarding entrance of the body 10. In addition, the wire harness routing structural part 30 is configured such that the wire harness 1 is routed by the weather strip 28 toward the vehicle interior.

The wire harness routing structural part 30 includes the wire harness 1, an outer sheathing member 40, a body fixating part 50, and the protector 60 (see FIG. 1).

The outer sheathing member 40 is provided in a configuration covering a circumference of a portion that includes the portion of the wire harness 1 spanning between the body 10 and the door 20. The outer sheathing member 40 is a member protecting the wire harness 1 from the exterior and supporting the wire harness 1 between the body 10 and the door 20.

Figure 4:
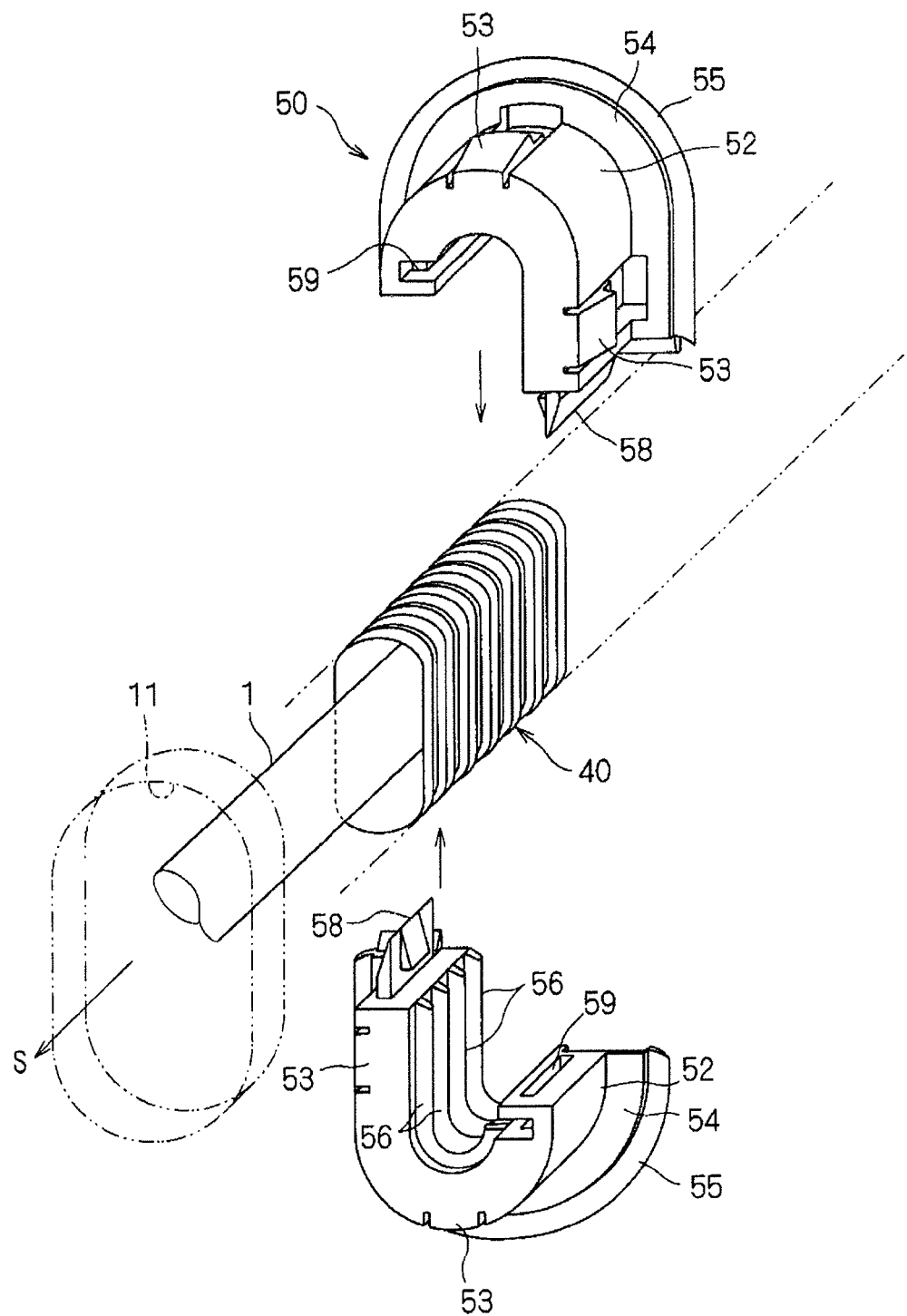
[FIG. 4] an exploded perspective view of a body fixating member.

The outer sheathing member 40 is a tubular member and covers the circumference of the wire harness 1, which is installed in a hollow portion of the outer sheathing member 40 (see FIG. 4). The outer sheathing member 40 is formed so as to be capable of bending deformation between the body 10 and the door 20 in conjunction with the open/close operation of the door 20, and is further formed so as to be capable of supporting the wire harness 1 by inhibiting flexing, warping, and sagging between the body 10 and the door 20 (see FIGS. 2 and 3).

More specifically, the outer sheathing member 40 is formed to have a greater rigidity than the wire harness 1. Herein, the outer sheathing member 40 is a corrugated tube in which a synthetic resin (e.g., PP (polypropylene), PA (polyamide), and the like) is extrusion molded in a tubular shape, and is produced by blow molding or vacuum molding. The corrugated tube is a tubular member having peaks protruding and valleys recessed along a circumferential direction, the peaks and valleys continuing alternatingly in an extension direction.

The outer sheathing member 40 is formed in a flat shape (herein, a shape where a pair of straight lines links a pair of opposing half-arcs, as seen in a cross-sectional view orthogonal to the extension direction). In other words, the outer sheathing member 40 has a shape that, in cross-section, is unlikely to bend in a long direction (has high rigidity) and is likely to bend in a short direction (has high flexibility).

However, the outer sheathing member 40 may have greater rigidity than the wire harness 1 and is not limited to the above-noted corrugated tube. For example, an outer sheathing member may be formed in a flat tubular shape with a comparatively hard rubber (such as EPDM (ethylene-propylene-diene rubber) or an elastomer). In addition, the outer sheathing member 40 is not limited to the flat shape and may be formed to have a round shape in cross-section, for example.

An end portion of the outer sheathing member 40 on the body 10 side is fixated to a portion of the wire harness 1 routed inside the body 10 by wrapping a tape 90 thereto or the like. In addition, a portion before the body 10-side end portion of the outer sheathing member 40 is fixated to the body 10 by the body fixating part 50, described below (see FIGS. 2 and 3). Thereby, a portion of the wire harness 1 is fixated to the body 10. In addition, an end portion of the outer sheathing member 40 on the door 20 side is fixated to a portion of the wire harness 1 routed within the door 20 (herein, within the protector 60, described below) by wrapping the tape 90 thereto or the like, thus enabling the outer sheathing member 40 to advance and retreat within the door 20 along with the wire harness 1.

The body fixating part 50 is a portion fixating (indirectly, in the present description) the wire harness 1 to the body 10. The body fixating part 50 fixates a portion of the wire harness 1 to the front pillar in a configuration where the wire harness 1 passes through the front pillar of the boarding entrance on the body 10.

Herein, the body fixating part 50 is mounted to the portion of the outer sheathing member 40 toward the body 10-side end portion, the end portion on the body 10 side of the outer sheathing member 40 being fixated to the wire harness 1. The body fixating part 50 is then fixated to an opening edge of the through-hole 11 formed in the front pillar (see FIG. 4). The body fixating part 50 is also a portion protecting outer sheathing member 40 and the wire harness 1 from the opening edge of the through-hole 11 (and is therefore also called an edge protector).

The body fixating part 50 includes an insertion part 52, a plurality of engagement parts 53, a flange 54, a bias 55, and a rib 56.

The insertion part 52 is capable of insertion within the through-hole 11 and is formed in a tubular shape capable of having the outer sheathing member 40 placed on an interior thereof. The insertion part 52 is inserted into the through-hole 11 directed substantially toward the forward side of the vehicle. Hereafter, for ease of description, an orientation in which the insertion part 52 is inserted into the through-hole 11 is referred to as an insertion direction S. This direction is also used to describe the orientation of the body fixating part 50 itself. Also, the insertion part 52 is between the outer sheathing member 40 and wire harness 1, which are passed through the through-hole 11, and the opening edge of the through-hole 11, thus preventing the outer sheathing member 40 and the wire harness 1 from contacting the opening edge and being damaged.

More specifically, an outer circumference of the insertion part 52 is set to a shape corresponding overall to the opening edge of the through-hole 11 and to a size slightly smaller than that of the through-hole 11. In addition, an inner circumference of the insertion part 52 is set to a shape corresponding to an exterior shape of the peaks on the corrugated tube used as the outer sheathing member 40 and to a size slightly larger than the exterior shape of the peaks. Herein, a corresponding shape is a shape that is substantially analogous and refers to a shape entirely following the shape of a mate. Herein, the insertion part 52 is formed in a tubular shape where, in a front view, a pair of straight lines link a pair of arced portions. However, the insertion part 52 may be formed in a shape corresponding to the exterior shape of the outer sheathing member 40 and to the shape of the opening edge of the through-hole 11, and is not limited to the above-noted shape.

The engagement part 53 is a portion flaring in an outward peripheral direction from the outer circumference of the insertion part 52 and engaging with the opening edge of the through-hole 11 from a forward side of the insertion direction S in a state where the insertion part 52 is inserted in the through-hole 11. More specifically, the engagement part 53 is a portion having a shape extending from the outer circumference of the insertion part 52 (herein, an end portion on the forward side of the insertion direction 5) in the outward peripheral direction and toward a rear side of the insertion direction S. A forefront end of the shape is treated as a free end. Also, a projection dimension of the engagement part 53 toward the outer circumference becomes gradually larger from the forward side of the insertion direction S toward the rear side. The engagement part 53 includes an engagement surface facing rearward in the insertion direction S at a location on the forefront end-side of the engagement part 53. In addition, due to a configuration in which the engagement part 53 flares in the outward peripheral direction from the outer circumference of the insertion part 52 and engages with the opening edge of the through-hole 11 by contact of the engagement surface from the forward side of the insertion direction S, the engagement part 53 is provided so as to be capable of elastic deformation even further in the inward peripheral direction.

Thereby, when the engagement part 53 passes through the through-hole 11, the engagement part 53 elastically deforms in the inward peripheral direction while contacting the opening edge of the through-hole 11 until accommodated within the through-hole 11. Moreover, after passing through the through-hole 11, the engagement part 53 returns to an original configuration due to an elastic restoration force and opposes the opening edge of the through-hole 11 from the forward side of the insertion direction S.

The engagement part 53 is provided at a plurality of circumferential direction positions of the insertion part 52. Herein, four of the engagement parts 53 are provided at middle portions of each of the pair of arced portions and the pair of straight lines so as to be evenly spaced in the circumferential direction of the insertion part 52.

The flange 54 is a portion formed in a flange shape flaring from the outer circumference of the insertion part 52 in the outward peripheral direction. In addition, in a state where the insertion part 52 is inserted into the through-hole 11, the flange 54 opposes the opening edge of the through-hole 11 from the rear side of the insertion direction S. Specifically, the outer circumference of the flange 54 is formed to a size larger than the through-hole 11.

In the insertion direction S, the flange 54 is provided so as to leave a space with respect to the engagement surface of the engagement part 53, the space being the same as or larger than (herein, slightly larger than) a thickness dimension of the opening edge of the through-hole 11. Also, in a state where the insertion part 52 is inserted into the through-hole 11, the opening edge of the through-hole 11 is between the engagement parts 53 and the flange 54. The flange 54 is thus positioned to the rear side of the insertion direction S of the opening edge of the through-hole 11. Thereby, the body fixating part 50 is retained in the insertion direction S in a state where the insertion part 52 is inserted in the through-hole 11.

The bias 55 is a portion for inhibiting jostling of the body fixating part 50 with respect to the body 10. The bias 55 inhibits jostling of the body fixating part 50 by biasing toward the forward side of the insertion direction S while holding the body 10 between the bias 55 and the engagement parts 53.

More specifically, the bias 55 is formed in an annularly flanged shape flaring from the outer circumference of the flange 54 in the outward peripheral direction. In addition, the bias 55 is formed in a shape gradually inclined toward the forward side of the insertion direction S as the forefront end (outer circumference side) is approached. In addition, the bias 55 is configured such that, with the above configuration, a location on the forefront end side (outer circumference side) is capable of elastic deformation toward the rear side of the insertion direction S.

A location toward the foremost end of the bias 55 is formed in a shape positioned in the insertion direction S so as to leave a space with respect to the engagement surface of the engagement part 53, the space being smaller than the thickness dimension of the opening edge of the through-hole 11. In addition, in a state where the insertion part 52 is inserted into the through-hole 11 and the engagement part 53 is engaged with the opening edge of the through-hole 11 from the forward side of the insertion direction S, a location toward the outer circumference of the bias 55 is pressed against a surface of the body 10 on the rear side of the insertion direction S around the opening edge of the through-hole 11 and elastically deforms toward the rear side of the insertion direction S. Thereby, the bias 55 enters a state biasing the body 10 toward the forward side of the insertion direction S by a force attempting to elastically restore the bias 55.

The rib 56 is a portion fixing a position of the outer sheathing member 40 installed within the insertion part 52 such that the outer sheathing member 40 is incapable of relative displacement in the extension direction thereof. Herein, the rib 56 is formed so as to be capable of engaging with the exterior form of the protrusions and recesses on the corrugated tube used as the outer sheathing member 40. More specifically, the rib 56 is formed in a protruding shape projecting from an inner circumferential surface of the insertion part 52 toward the inner circumference along the circumferential direction. A plurality of the ribs 56 are provided in the through direction of the insertion part 52 at an interval corresponding to the valleys in the extension direction of the outer sheathing member 40 (i.e., at an identical interval, at an interval of every second valley, or the like).

The body fixating part 50 is configured by joining a pair of separate members (herein, substantially J-shaped members) together (see FIG. 4). In other words, by joining a pair of combining members with the outer sheathing member 40 therebetween, the ribs 56 engage with the outer circumference of the outer sheathing member 40 and the body fixating part 50 is mounted on the outer sheathing member 40 so as to be incapable of relative displacement in the extension direction of the outer sheathing member 40. By fixating the body fixating part 50 on the opening edge of the through-hole 11, the wire harness 1 is fixated to the body 10 in a configuration inserted through the through-hole 11, the wire harness 1 being covered by the outer sheathing member 40.

Herein, the body fixating part 50 includes an engagement part 58 protruding from a first end portion of each of the facing portions of the pair of separate members, and a receiver 59 formed on a second end portion of each that is capable of engaging with the engagement part 58. More specifically, the engagement part 58 is a portion having an engagement clip protruding in the inner circumferential direction of the separate members from the forefront end of the insertion part, which protrudes from the first end portion of the separate members. The engagement clip is formed in a substantially triangular shape in a cross-sectional view, the substantially triangular shape having a projection dimension gradually increasing from the forefront end side toward the base end side. The engagement clip includes an engagement surface facing the base end side. In addition, the receiver 59 is formed in a recessed shape opening at a second end face of the separate member. The receiver 59 includes a hole capable of having the engagement clip of the engagement part 58 positioned on an inner circumferential side on an interior thereof. Also, when the engagement part 58 is inserted in the receiver 59, the engagement surface of the engagement clip abuts and engages with a first wall surface in the hole of the receiver 59. Thereby, a state is maintained in which the pair of separate members are joined together.

Also, the body fixating part 50 is fixated to the opening edge of the through-hole 11 in a manner such that the outer sheathing member 40 is flat along the connection axis of the hinge 19. Thereby, bending of the wire harness 1, which is installed within the outer sheathing member 40, is constrained to a direction parallel to the connection axis of the hinge 19 and the wire harness 1 is likely to bending deform on a plane orthogonal to the connection axis. In addition, the wire harness 1 is connected more smoothly to the door 20, which is open/close operated around the connection axis.

However, the body fixating part 50 is not limited to the above-described shape. For example, a body fixating part may be configured to be connected by a hinge at two facing end portions on one side of the pair of separate members and to be capable of opening and closing. Also, the joined state of the body fixating part may be maintained by omitting the engagement part 58 and the receiver 59 and fixating the body fixating part to the through-hole 11 in a state where the pair of separate members face each other.

The body fixating part may also be configured without the bias 55. Also, instead of the rib 56, the body fixating part may include a projecting piece for fixating the outer sheathing member 40 or the wire harness 1, the projecting piece projecting forward or rearward in the insertion direction S. In other words, a portion of the outer sheathing member 40 or the wire harness 1 extending toward one direction of the insertion direction S of the body fixating part may be fixated to the projecting piece by fastening wound tape or a bundling band thereto, or the like. Moreover, the bundling band refers to a member capable of incrementally adjusting and holding a circumferential direction dimension of an annular body. When such a projecting piece is used, the body fixating part may be entirely and integrally formed by injection molding.

The protector 60 is a portion accommodating the wire harness 1 such that extra length of the wire harness 1 can be absorbed as well as protecting the wire harness 1 from the exterior, the wire harness 1 being guided for insertion and extraction within the door 20 accompanying the open/close operation of the door 20. The protector 60 includes an accommodation part and a different path guide part 82, the accommodation part having an extra length absorption portion 62 and a guide portion 72. Hereafter, the protector 60 is described using the front-back direction of the protector 60 when installed in the door 20.

Figure 5:
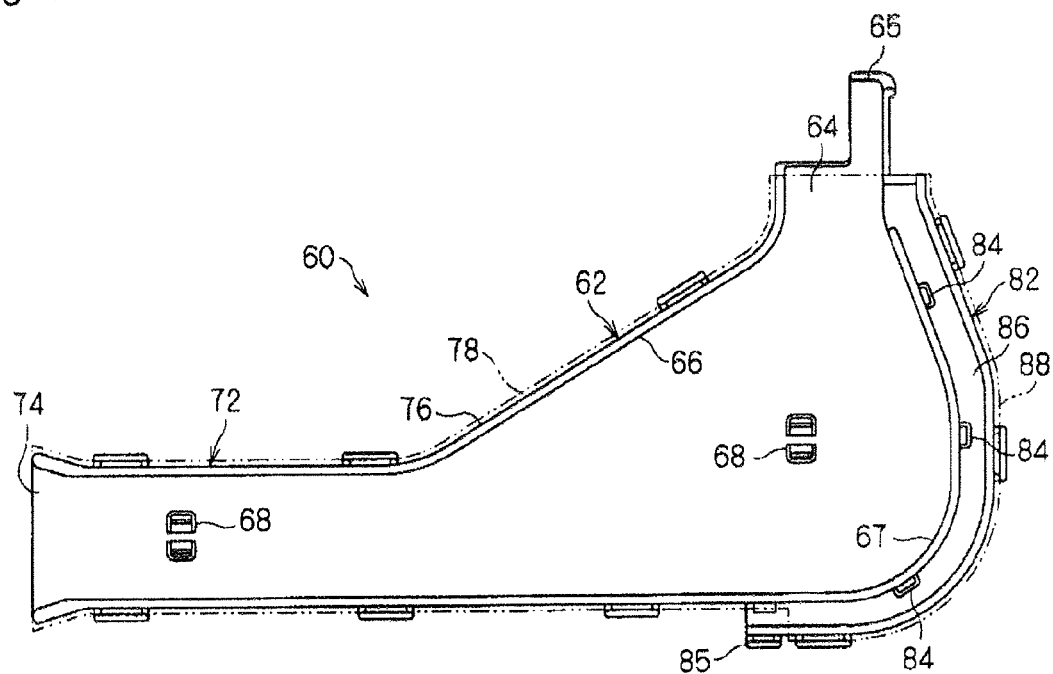
[FIG. 5] a lateral view of a protector.
Figure 6:
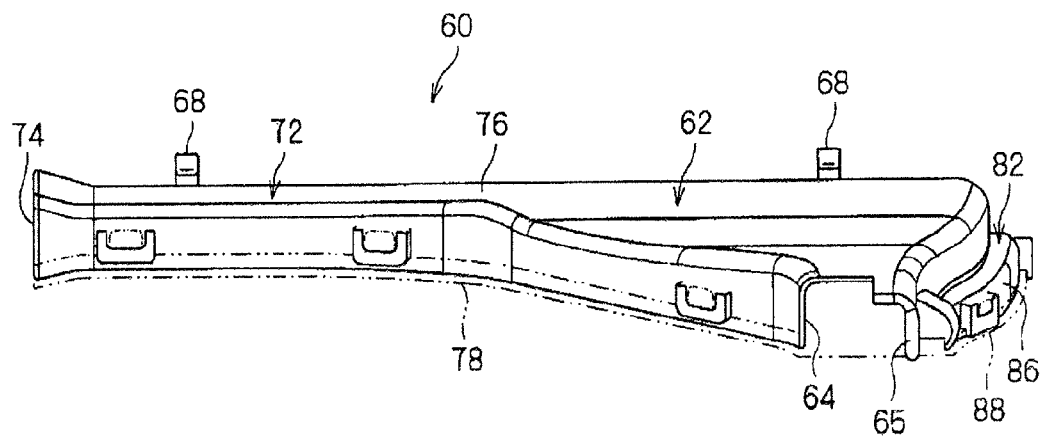
[FIG. 6] a plan view of the protector.

The protector 60 is positioned within the door 20 and is a portion guiding, with the guide portion 72, an advance and retreat path of a portion that includes the door 20-side end portion of the outer sheathing member 40 covering the wire harness 1. In addition, the protector 60 is a portion accommodating, with the extra length absorption portion 62, the wire harness 1 with a space allowing redirection of the wire harness 1, the wire harness 1 extending out from the door 20-side end portion of the outer sheathing member 40 (see FIGS. 5 and 6). The protector 60 includes, on the guide portion 72, an insertion opening 74 into which the outer sheathing member 40 that covers the wire harness 1 is inserted. In addition, the protector 60 includes an extraction opening 64 on the extra length absorption portion 62 for extracting the wire harness 1 to an interior of the door 20. In addition, with a different path guide part 82 the protector 60 guides the different path wire 3 of the wire harness 1 extracted from the extraction opening 64, the different path wire 3 being guided in a direction different from the direction of extraction from the extraction opening 64 (a path different from that of the main path wire 2). Herein, a description is given of an example where the insertion opening 74 and the extraction opening 64 run through in substantially orthogonal directions and the protector 60 is formed in substantially an overall "L" shape in a lateral view.

The guide portion 72 includes the insertion opening 74 on a body 10-side end portion, has a door 20-side end portion formed in a tubular shape linked with the extra length absorption portion 62, and guides a displacement path of a portion including the door 20-side end portion of the outer sheathing member 40. More specifically, the guide portion 72 is formed in a tubular shape having substantially a rectangular shape in a cross-sectional view orthogonal to the extension direction. In addition, by contacting the outer circumference of the outer sheathing member 40 inserted through the insertion opening 74, the guide portion 72 constrains a path to a release direction with respect to the center axis of the outer sheathing member 40 (chiefly a short direction in a cross-sectional view, i.e., the vehicle interior-exterior direction). However, the guide portion 72 may be capable of constraining the path of the outer sheathing member 40 chiefly to the short direction in a cross-sectional view, and may also be formed in a tubular shape having an elliptical shape, a circular shape, or a polygonal shape in a cross-sectional view.

Figure 7:
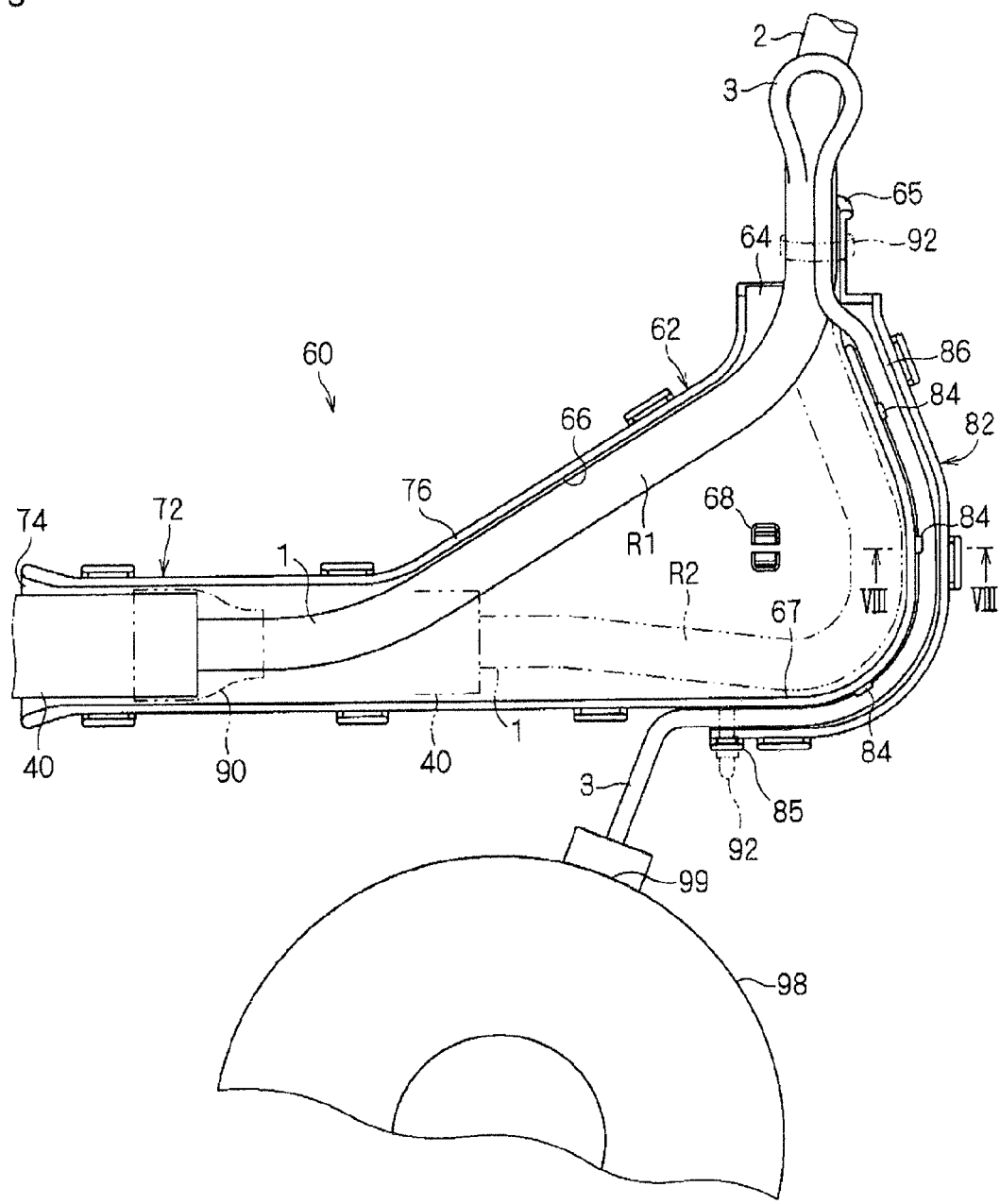
[FIG. 7] a lateral view illustrating a routing configuration of a different path wire in the protector.

A relationship between the guide portion 72 and the outer sheathing member 40 is such that, in a state where the outer sheathing member 40 is fixated to the body 10 by the body fixating part 50 and where the door 20 is open, the outer sheathing member 40 is set to an extension dimension long enough that at least the portion of the outer sheathing member 40 including the door 20-side end portion is inserted within the guide portion 72 (see FIG. 7). Meanwhile, when the door 20 is open/close operated, the guide portion 72 may be capable of guiding the portion of the outer sheathing member 40 that includes the door 20-side end portion toward the extra length absorption portion 62, the outer sheathing member 40 advancing and retreating within the door 20. Thus, in a state where the door 20 is closed, the outer sheathing member 40 is set to an extension dimension where the door 20-side end portion of the outer sheathing member 40 projects into the extra length absorption portion 62.

The guide portion 72 is formed in substantially a straight line shape, has the insertion opening 74 positioned on an interior of the introduction opening 21 that opens at the front end portion of the door 20, and is positioned oriented along the front-back direction of the door 20.

In addition, the insertion opening 74 of the guide portion 72 has at least a portion in the circumferential direction formed in a shape expanding gradually in the outer circumferential direction toward an opening end portion. Herein, the insertion opening 74 expands toward the opening end portion around an entire circumference. In addition, the insertion opening 74 may be formed in a shape rounded at an inner peripheral edge portion and an outer peripheral edge portion of at least a portion of the opening end portion in a circumferential direction (herein, at a site positioned on a vehicle exterior side of and above/below the outer sheathing member 40).

The extra length absorption portion 62 is a portion continuous with a second end side (rear side) of the guide portion 72 and includes an accommodating space capable of accommodating the wire harness 1 with a space allowing redirection of the wire harness 1, the wire harness 1 extending out from the door 20-side end portion of the outer sheathing member 40 guided to the interior by the guide portion 72. In addition, the extraction opening 64 of the extra length absorption portion 62 is provided at a site where the accommodating space is between the extraction opening 64 and the guide portion 72.

The extra length absorption portion 62 is formed to be capable of accommodating the wire harness 1, extending from the door 20-side end portion of the outer sheathing member 40, so as to allow the extra length of the wire harness 1 to be redirected and absorbed by bending the wire harness 1 between a first path R1 and a second path R2 bulging such that a middle portion of the second path R2 is distant from the first path R1 (see FIG. 7).

More specifically, the extra length absorption portion 62 includes a first wall 66 and a second wall 67 facing each other with the accommodating space therebetween in a lateral view. The wire harness 1 accommodated within the accommodating space is installed so as to approach the first wall 66 when following the first path R1 and so as to approach the second wall 67 when following the second path R2. In other words, in a state where the wire harness 1 follows the first path R1, a space exists which is capable of redirecting the wire harness 1 toward the second wall 67. The first wall 66 and the second wall 67 each have a first end portion connected at a second (rear side) end of the guide portion 72 and a second end portion connected to the extraction opening 64. More specifically, the first wall 66 extends in substantially a straight line shape linking the rear end of the guide portion 72 with the extraction opening 64 of the extra length absorption portion 62 on an inner circumferential side of the protector 60, the protector 60 having substantially an "L" shape in a lateral view. In addition, the second wall 67 extends in substantially an "L" shape linking the rear end of the guide portion 72 with the extraction opening 64 on the outer circumferential side of the protector 60, the protector 60 having substantially an "L" shape in a lateral view, while leaving a gap the size of the accommodating space with the first wall 66. In other words, the extra length absorption portion 62 is formed in substantially a right-angle triangular shape in which the first wall 66 is the hypotenuse in a lateral view. Moreover, in FIG. 5, for example, a site on the second wall 67 on a rear side of the guide portion 72 is formed in a shape swelling slightly in a direction separating from the guide portion 72 (toward the rear side).

Also, in a state where the door 20 is open, the extra length absorption portion 62 accommodates the wire harness 1, extending from the door 20-side end portion of the outer sheathing member 40, in a configuration where the wire harness 1 follows the first path R1, which leaves space allowing redirection toward the second wall 67. In addition, in a state where the door 20 is closed, the extra length absorption portion 62 accommodates the wire harness 1 in a configuration where the wire harness 1 follows the second path R2. In other words, the extra length absorption portion 62 absorbs the extra length of the wire harness 1 accompanying a close operation of the door 20 by redirecting a portion of the wire harness 1 that is pressed into the accommodating space by close-operating the door 20 from an open position to a closed position, the portion of the wire harness 1 being bent within the accommodating space and redirected from the first path R1 to the second path R2, which is longer than the first path R1.

In addition, the extra length absorption portion 62 includes an extraction point positioner 65 capable of fixating the wire harness 1 at the extraction opening 64. The extraction point positioner 65 is formed in a shape in which an opening end portion of the extraction opening 64 partially extends (herein, in an "L" shape in a cross-sectional view). Also, in a state where the wire harness 1 extracted through the extraction opening 64 abuts an inner side of the extraction point positioner 65, the position of the wire harness 1 can be fixed with respect to the protector 60 at the extraction opening 64 by fastening with a bundling band 92 or by tape winding (herein, by fastening with the bundling band 92). Thereby, even when the wire harness 1 is advanced or withdrawn within the extra length absorption portion 62 during the open/close operation of the door 20, pulling or warping can be inhibited from occurring in the wire harness 1 routed within the body 10.

The different path guide part 82 is a portion guiding the different path wire 3 on a path following an outer surface of the extra length absorption portion 62 that is different from that of the main path wire 2, the different path wire 3 being in the wire harness 1 extracted from the extraction opening 64 (see FIGS. 1 and 7). More specifically, the different path guide part 82 guides the different path wire 3 toward a connection location 99 (for example, a connector) with an electrical device to be connected to the different path wire 3, the different path wire 3 being branched off from the main path wire 2 in the wire harness 1 extracted from the extraction opening 64 and U-turned. Moreover, the wire harness 1 is routed from the body 10 side to the door 20 side and is configured by bundling the main path wire 2 and the different path wire 3 until the wire harness 1 is extracted from the extraction opening 64 after routing through the guide portion 72 and the interior of the extra length absorption portion 62 of the protector 60.

Herein, the protector 60 has the extraction opening 64 of the extra length absorption portion 62 positioned on the interior of the door 20 in an upward-facing orientation. Moreover, facing upwards is not limited to a case of facing perpendicularly upward but also refers to cases inclined with respect to the perpendicular which are turned upward. Also, the electrical device to be connected to the different path wire 3 is the speaker 98, as noted above. Further, the protector 60 is located in a position above the speaker 98. In other words, the main path wire 2 is routed toward an upper side on the interior of the door 20, while in contrast the different path guide part 82 is formed in a shape guiding the different path wire 3 on a path directed downward from the extraction opening 64.

The different path guide part 82 opens toward the interior of the extraction opening 64 on a first side and opens at a position adjacent to the connection location 99 with the speaker 98 on a second side. From a vantage of protecting the different path wire 3 from the exterior, the opening position on the second side of the different path guide part 82 may be set to a position on the outer surface of the extra length absorption portion 62 closest to the connection location 99 with the speaker 98, the outer surface of the extra length absorption portion 62 facing a direction orthogonal to the vehicle interior-exterior direction. In other words, an exposed portion is preferably reduced up to a position where the different path wire 3 is connected to the speaker 98. FIG. 7 shows an example in a lateral view where the different path guide part 82 is set such that the position of the opening is positioned directly opposite the connection location 99 of the speaker 98.

A location where the different path guide part 82 is formed is as follows. Herein, the different path guide part 82 forms a path following a rear side of the extra length absorption portion 62 in a state where the protector 60 is positioned inside the door 20. More specifically, the different path guide part 82 is formed along the outer surface of a portion of the second wall 67 of the extra length absorption portion 62, the second wall 67 constraining the path to a path (the second path R2) bending the wire harness 1 toward the extraction opening 64 by abutting the wire harness 1, the wire harness 1 being inserted into the interior of the extra length absorption portion 62 from the body 10 side (see FIG. 1). In other words, the different path guide part 82 is provided at a portion of the extra length absorption portion 62 against which the wire harness 1 is pressed, the wire harness 1 advancing and retreating within the extra length absorption portion 62 accompanying the open/close operation of the door 20. In fact, portions of the second wall 67 against which the wire harness 1 is likely to be pressed are a curved portion and two side portions having the curved portion therebetween. The different path guide part 82 extends across this range.

The different path guide part 82 is formed in a tubular shape, one wall of which is formed by a portion of the second wall 67 of the extra length absorption portion 62. Also, the different path guide part 82 has a wall standing up in a rib shape with respect to the outer surface of the extra length absorption portion 62 (herein, of the second wall 67). In other words, the wall stands up on the outer surface of the second wall 67 on the extra length absorption portion 62, the wall formed by a portion of the different path guide part 82. Therefore, the portion formed on the extra length absorption portion 62 by the different path guide part 82 increases strength. Specifically, the extra length absorption portion 62 has a configuration reinforced at a portion of the second wall 67 against which the wire harness 1 is pressed.

The protector 60 is configured by assembling a pair of members. More specifically, the protector 60 can be configured by joining together a recessed first member 76 and a lid-shaped second member 78, each formed by injection molding or the like of a synthetic resin material such as PP (polypropylene), PA (polyamide), or the like, for example. Also, the first member 76 and the second member 78 are made adjacent in the vehicle interior-exterior direction in a state where the protector 60 is placed in the door 20, and then are joined together. In other words, in order to seal an opening of the first member 76, the second member 78 is joined thereto, thereby assembling the protector 60.

The protector 60 includes an engagement structure for maintaining a state where the first member 76 and the second member 78 are joined together. More specifically, the engagement structure includes a receiver provided to a plurality of locations on the outer circumference of the opening edge of the first member 76 and an engager provided to a plurality of locations on the lateral edge of the second member 78, the engager engaging with the respective receivers.

Figure 8:
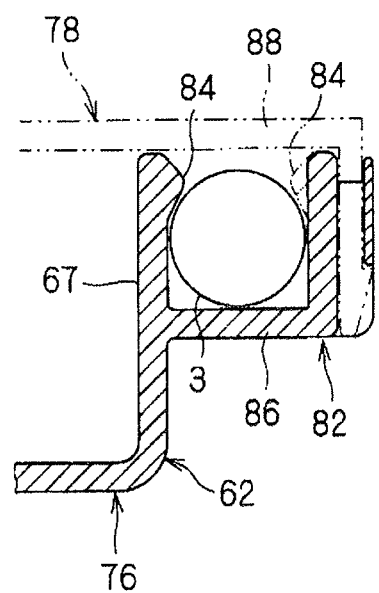
[FIG. 8] a cross-sectional view along a line VIII-VIII in FIG. 7.

The different path guide part 82 is configured to include a trench-shaped portion 86 formed on the first member 76 and a lid-shaped portion 88 formed on the second member 78 and sealing the trench-shaped portion 86 when the second member 78 is joined with the first member 76 (see FIG. 8). Herein, the trench-shaped portion 86 forms substantially a "U" shape in a cross-sectional view orthogonal to the extension direction, the "U" shape being formed by a portion of the second wall 78 as a first side wall, a bottom portion projecting from the outer surface of the second wall 78, and a second side wall continuous with the bottom portion and opposite the outer surface with a space therebetween. The trench-shaped portion 86 opens in the overall opening direction of the first member 76 (a vehicle interior side during installation in the door 20). In addition, the trench-shaped portion 86 may be set to a size capable of having the different path wire 3 placed in the interior thereof (a depth dimension larger than the diameter of the different path wire 3). The lid-shaped portion 88 is a portion including the terminal edge portion on the rear side of the second member 78. Also, by joining the second member 78 with the first member 76, the tubular different path guide part 82 is formed by the trench-shaped portion 86 and the lid-shaped portion 88.

However, the different path guide part 82 is not limited to a configuration resulting from assembly of the trench-shaped portion 86 and the lid-shaped portion 88. For example, a trench-shaped portion of a first member may be formed in a shape opening in a direction orthogonal to a vehicle interior-exterior direction in a state where a protector is placed inside the door 20, and a lid-shaped portion of a second member may include a portion following the vehicle interior-exterior direction so as to seal the opening of the trench-shaped member. Alternatively, a configuration is also possible in which a trench-shaped portion of a first member is set to a depth dimension smaller than the diameter of the different path wire 3, a lid-shaped portion of a second member is formed in a recessed shape, and the different path wire 3 is installed in a space formed by a continuous interior space of each portion.

In addition, a different path guide part may also omit the lid-shaped portion and be configured only by the trench-shaped portion 86. In such a case, a retention portion 84, described hereafter, may be provided in order to inhibit the different path wire 3 from slipping out of the trench-shaped portion 86 used as the different path guide part. Another configuration is possible in which a different path guide part is formed in a trench shape or a tube shape by a portion having substantially an "L" shape in a cross-sectional view and by a portion of a second member, the substantially "L" shaped portion including a portion of the second wall 67 of the first member and a portion flaring in a rib shape from the second wall 67. In other words, the different path guide part 82 may have at least a trench shape so as to be capable of guiding the different path wire 3.

The different path guide part 82 includes a retention portion 84 engaging with the different path wire 3 installed within the trench-shaped portion 86 (see FIG. 8). More specifically, the retention portion 84 is formed jutting from a first inner surface of a pair of side walls of the trench-shaped portion 86 toward a second side wall. Herein, the retention portion 84 is provided so as to jut from the first side wall, which is a portion of the second wall 78. A gap between the forefront end of the retention portion 84 and the second side wall is set to be smaller than the size (diameter) of the different path wire 3. However, the retention portion 84 may also jut from the second side wall (see the retention portion 84 shown in a two-dot-dashed lined in FIG. 7) and may also jut from both of the pair of side walls. In addition, a plurality of the retention portions 84 are provided in the extension direction of the different path guide part 82 (see FIG. 7). Also, when the different path wire 3 is pressed into an interior side of the retention portion 84 on the trench-shaped portion 86 of the different path guide part 82, a position of the different path wire 3 is constrained by the retention portion 84 and is maintained within the trench-shaped portion 86.

Further, a different path wire fixating part 85 is provided on a speaker 98-side end portion of the different path guide part 82. The different path wire fixating part 85 is a portion where the different path wire 3 is fastened by the bundling band 92 and fixated at the speaker 98-side end portion of the different path guide part 82. More specifically, the different path wire fixating part 85 is a site formed on the speaker 98-side end portion of the different path guide part 82 and includes a first through-hole and a second through-hole, the first through-hole running through a portion of the bottom of the different path guide part 82, the second through-hole having substantially a "D" shape projecting from the outer surface of the side wall on the outer side (see FIG. 5). In addition, the bundling band 92 is fastened by being passed through the first through-hole and the second through-hole in a configuration encircling the different path wire 3 installed within the different path guide part 82. Thereby, the different path wire 3 can be fixated with respect to the protector 60. However, a different path wire fixating part may also be formed in a shape in which a bottom and a side wall on an outer side extend outward at an end portion of a different path guide part, and a bundling band or tape is then wound thereto to fixate a different path wire.

Specifically, to summarize the routing of the different path wire 3, the wire harness 1 having the main path wire 2 and the different path wire 3 and extracted from the extraction opening 64, and the different path wire 3 U-turned just beyond the extraction point positioner 65 are fixated by the bundling band 92 to the extraction point positioner 65, then the different path wire 3 which was U-turned and returned inside the extraction opening 64 is positioned in the different path guide part 82. More specifically, the different path wire 3 is positioned on a further interior side of the retention portion 84 on an interior of the trench-shaped portion 86 of the different path guide part 82, and rests between the trench-shaped portion 86 and the lid-shaped portion 88 placed on top of the trench-shaped portion 86. Also, the different path wire 3, which is fixated to the different path wire fixating part 85 at the second end portion of the different path guide part 82, extends out from the different path guide part 82 and is routed toward the speaker 98, then is connected to the speaker 98 at the connection location 99.

Figure 9:
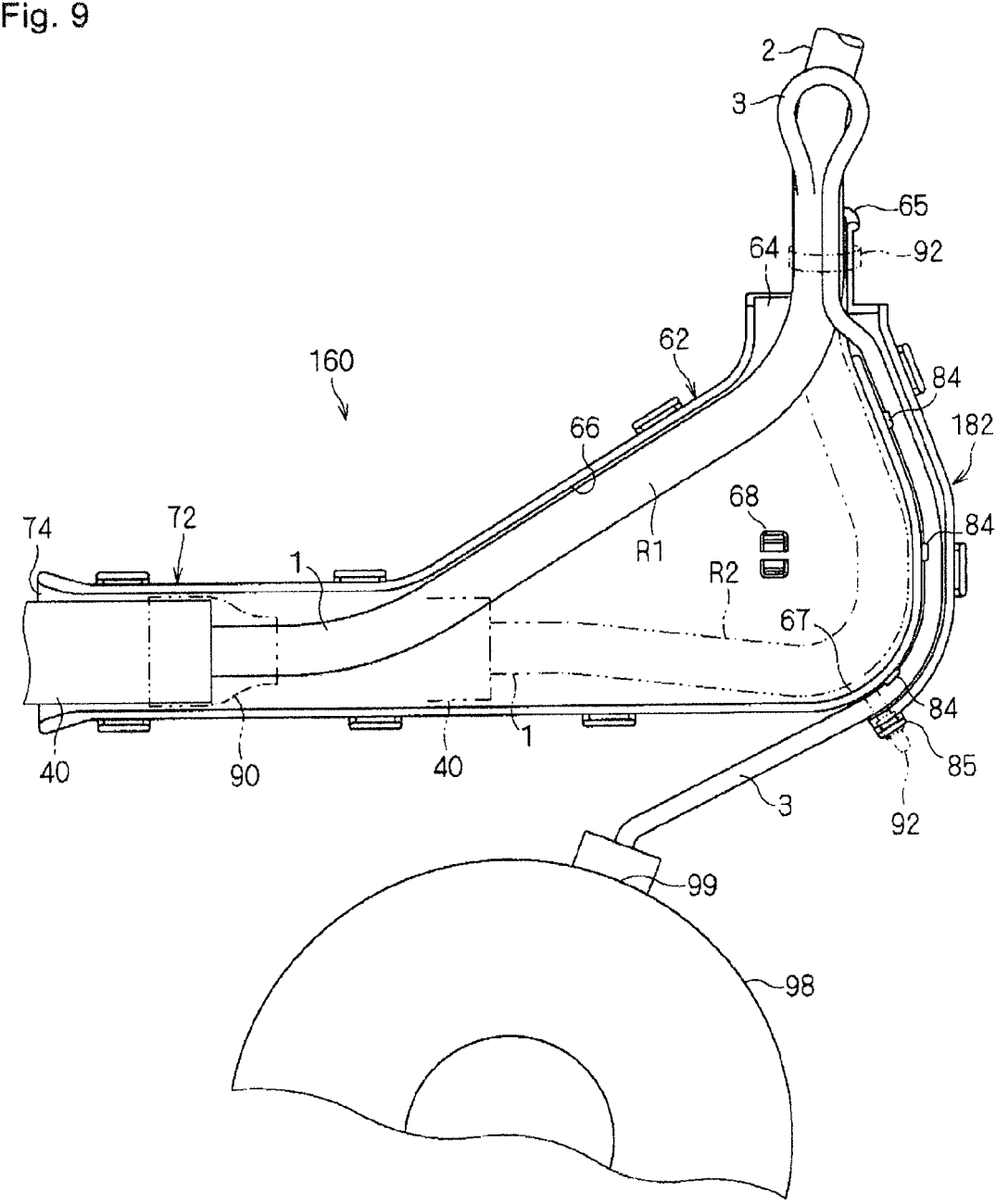
[FIG. 9] a lateral view of a protector according to an alternate example.

However, the different path guide part 82 is not limited to the above configuration. FIG. 9 illustrates a protector 160 in which a position of an opening on the speaker 98 side of a different path guide part 182 is set from a vantage of routing the different path wire 3 on a short path. In other words, in a lateral view, the position of the opening of the different path guide part 182 is defined at a position of a point of contact with the outer surface, the position being on a tangential line with the terminal edge portion of the extra length absorption portion 62, the tangential line running through the connection location 99 of the speaker 98. Moreover, according to this configuration, the different path wire 3 extending from the opening of the different path guide part 182 is routed toward the connection location 99 with the speaker 98 in substantially a straight line shape. In such a case, a load due to bending of the different path wire 3 can be alleviated.

In addition, when various wires connected to a plurality of electrical devices are defined as the different path wire 3, the position of the opening of the different path guide part 82 may be determined by a routing path of each of the different path wires 3 corresponding to each electrical device. For example, the position of the opening may be set to a position adjacent to a connection location of the different path wire 3 to be connected to the electrical device installed in a position closest to the protector 60.

Also, a different path guide part may be formed so as to extend from a rear side of the extra length absorption portion 62 to below the guide portion 72. In other words, the different path guide part is not limited to a case where the different path guide part is formed along the outer surface of the extra length absorption portion 62 and may instead be formed along the outer surface of an accommodation part that includes the extra length absorption portion 62 and the guide portion 72.

In addition, the different path guide part may be formed intermittently along the outer surface of the extra length absorption portion 62. Moreover, the different path guide part may be formed along the outer surface of the extra length absorption portion 62 even when another component on the protector lies between the different path guide part and the outer surface.

The protector 60 is accommodated partially or entirely within the recess 23 formed in the inner door panel 22 on an interior of the door 20, i.e., between the inner door panel 22 and the door trim 26.

The protector 60 is fixated to the door 20 in a state positioned within the recess 23. The protector 60 includes, as a configuration for this purpose, a fixating part 68 capable of engaging with a hole formed in the inner door panel 22 of the door 20 (see FIGS. 2 and 3). The fixating part 68 is formed in a shape that engages with the hole by pressing the protector 60 against the inner door panel 22 in the vehicle exterior direction. For example, a configuration is employed as the fixating part 68 which includes a linchpin projecting from the outer surface of the protector 60 and an engagement part formed in a shape flaring from the forefront end thereof in the outward peripheral direction. The engagement part is capable of elastic deformation between a mode capable of engaging with the opening edge of the hole and a mode deformed in the inward peripheral direction from the engagement. Herein, two of the fixating parts 68 are included so as to project from each of the extra length absorption portion 62 and the guide portion 72 on a vehicle exterior-side lateral surface of the protector 60. In addition, by inserting the fixating part 68 into the hole formed on the inner door panel 22, the engagement part abuts the opening edge of the hole and elastically deforms toward the inner circumferential side, then elastically returns to the outer circumferential side at a position past the hole and engages with the opening edge of the hole from the vehicle exterior side.

However, as a configuration for fixating the protector 60 to the door 20, other fixating structures may be employed as well. For example, the protector 60 may have a shape enabling fixation to the inner door panel 22 by screwing down, bolting down, stud-bolting, bracket fixation, or the like. Also, the protector 60 may be fixated to the door trim 26 as the inner sheathing member.

The description of the protector 60 to this point has been given using an example where the extraction opening 64 is positioned on the interior of the door 20 in the upward-facing orientation. However, the protector 60 may also be positioned such that the extraction opening 64 is oriented downward. In such a case, using the extraction opening 64 as a reference in the vertical direction of the door 20, the electric wires connected to the electrical devices including the speaker 98 installed in comparatively lower positions are routed as main path wires and the electric wires connected to the electrical devices installed in comparatively higher positions are guided by the different path guide part 82 and routed as different path wires.

In addition, the description of the protector 60 has been given for an example configured with the first member 66 having a recessed shape and the second member 67 having a lid shape. However, a protector may also be configured by assembly of members having recessed shapes. Also, the protector 60 may be a recessed member and be configured such that an opening thereof is sealed by a portion of the door trim 26. In such a case, a portion of the different path guide part may be configured by a portion of the door trim 26.

The shape of the protector 60 described above is exemplary and various other shapes can be employed. Specifically, the protector 60 may have any configuration capable of accommodating the wire harness 1, which is inserted through the insertion opening 74, so as to leave a space allowing redirection by the extra length absorption portion 62, and may be shaped in consideration of the shape of the door 20 or the like according to vehicle model. For example, a protector may have a shape in which the extra length absorption portion 62 is directly continuous with a rear side of the insertion opening 74. Additionally, a shape may be employed having an accommodation part capable of accommodating the wire harness 1 by winding the wire harness 1 in an annular shape and capable of redirecting the wire harness 1 by changing a diameter of the annular portion. In such a case as well, the different path guide part 82 may be formed along the outer surface of the extra length absorption portion 62.

The wire harness routing structural part 30 may modularize the wire harness 1 routed into the door 20 from the body 10, the outer sheathing member 40, the body fixating part 50, and the protector 60 and assemble the components before assembling the vehicle. Specifically, in addition to placing the outer sheathing member 40 over the wire harness 1, the tape 90 is wound on the wire harness 1 extending from each of the first and second ends of the outer sheathing member 40 to fixate the wire harness 1, and the body fixating part 50 is mounted on a portion toward the first end of the outer sheathing member 40. In addition, the portion including the second end of the outer sheathing member 40 is installed within the guide portion 72 of the first member 76 on the protector 60, and also the wire harness 1 extending out from the second end of the outer sheathing member 40 is accommodated within the extra length absorption portion 62 and extracted through the extraction opening 64. The different path wire 3 in the wire harness 1 extracted through the extraction opening 64 is U-turned and returned inside the extraction opening 64, then the wire harness 1 and the U-turned different path wire 3 are fixated with respect to the extraction point positioner 65 by the bundling band 92. Moreover, the U-turned different path wire 3 is positioned on the interior of the trench-shaped portion 86 of the different path guide part 82 via the opening on the extraction opening 64 side, and is fixated on the different path wire fixating part 85 at the location of the opening on the second side by the bundling band 92. In addition, the second member 78 is joined with the first member 76.

Up to this point, a description has been given using an example where the outer sheathing member 40 was placed over the wire harness 1. However, when the wire harness 1 itself has sufficiently high rigidity to be capable of inhibiting flexing, warping, and sagging, the outer sheathing member 40 may be omitted. However, from a vantage of protecting the wire harness 1 and regulating a bending direction, providing the outer sheathing member 40 is preferred.

Further, a description has been given using an example where the wire harness routing structural part 30 has been applied to the door 20 as a forward side door. However, the wire harness routing structural part 30 may also be applied to a rear side door or the like connected to the body 10 by the hinge 19. In such a case, the wire harness 1 bridges between a center pillar (a pillar between the forward side door and the rear side door) and the rear side door. In other words, a through-hole is formed on the center pillar and the body fixating part 50 is attached thereto.

According to the wire harness routing structural part 30 according to the above embodiment, members other than the protector 60 such as a fixating member for fixating to the door 20 or a protective member for protection from nearby members can be omitted for the different path wire 3 of the wire harness 1, the different path wire 3 being routed on a path different from that of the main path wire 2. The number of components for routing the wire harness 1 within the door 20 can thus be reduced.

In addition, the different path guide part 82 can guide the different path wire 3 more compactly due to having a shape that guides the different path wire 3 along the outer surface of the extra length absorption portion 62 (or of the guide portion 72). Further, as compared to a case where the different path wire 3 is routed away from the protector 60, routing can be performed on a shorter path.

Also, the different path guide part 82 forms a path along a rear side of the extra length absorption portion 62, and therefore an increase in the dimensions of the protector 60 in the vehicle interior-exterior direction of the door 20 can be inhibited. The different path guide part 82 can thus be applied even in a case with strict restrictions on space on the vehicle interior and exterior sides of the extra length absorption portion 62 (and the guide portion 72) on the interior of the door 20.

Further, the different path guide part 82 has a rib-shaped wall rising up with respect to the outer surface of the extra length absorption portion 62, and therefore strength of the extra length absorption portion 62 can be increased without making walls of the extra length absorption portion 62 thicker. Moreover, herein, the different path guide part 82 is formed along an outer surface of a portion of the second wall 67, the second wall 67 contacting the wire harness 1 inserted into the interior of the extra length absorption portion 62 from the body 10 side and thus capable of confining the wire harness 1 to a path bending toward the extraction opening 64. Therefore, strength can be improved in a location where a load is likely to be received due to pressure and abutment by the wire harness 1.

Generally, the various electrical devices installed in the door 20 are placed in positions on the upper side of the door 20. Given this, the protector 60 is placed on the interior of the door 20 in an orientation where the extraction opening 64 faces upwards. Also, the different path guide part 82 is formed in a shape guiding the different path wire 3 on a path directed downward from the extraction opening 64. Therefore, the path of the main path wire 2 can be set toward an upper position in the door 20 where a comparatively large number of electrical devices are located, and the path of the different path wire 3 can be set toward a lower position in the door 20 where a comparatively small number of electrical devices are located. Thus, the routing path of the wire harness 1 within the door 20 can be made shorter.

In addition, the protector 60 is configured by assembling the first member 76 and the second member 78, and the different path guide part 82 includes the trench-shaped portion 86 formed on the first member 76. Therefore, when the wire harness 1 is installed on the interior of the protector 60, the different path wire 3 can be installed by positioning the different path wire 3 on the interior of the trench-shaped portion 86. Workability of assembling the protector 60 can thus be improved.

Further, the different path guide part 82 includes the retention portion 84 engaged with the different path wire 3 installed on the interior of the trench-shaped portion 86, and therefore the different path wire 3 installed on the interior of the trench-shaped portion 86 can be inhibited from falling out. In addition, the first member 76 and the second member 78 can be assembled more readily.

<Second Embodiment>

Figure 10:
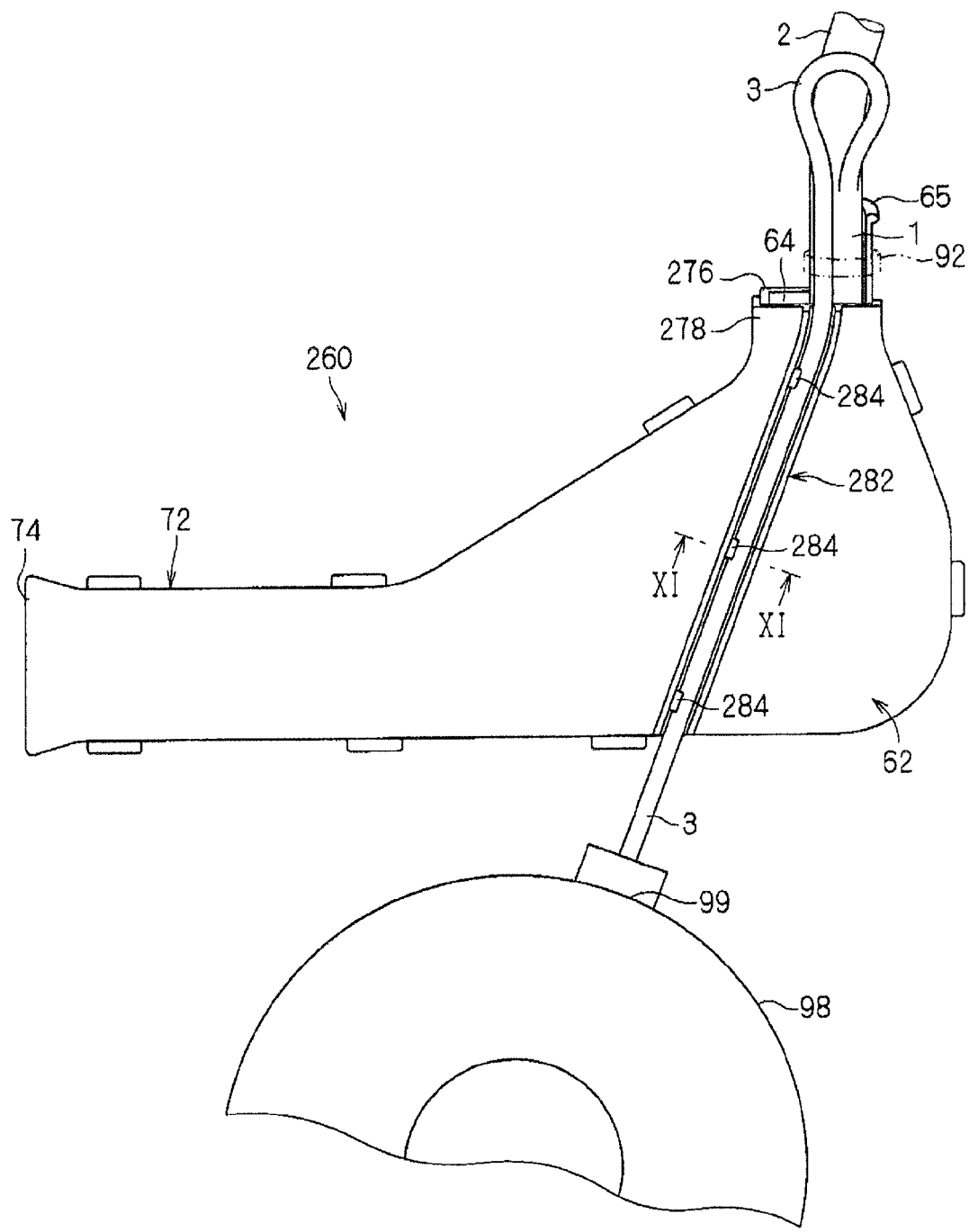
[FIG. 10] a lateral view of a protector according to a second embodiment.

Next, a description is given of a wire harness routing structural part according to a second embodiment. The only portion of the wire harness routing structural part according to the second embodiment that is different from the wire harness routing structural part 30 according to the first embodiment is a different path guide part 282 of a protector 260. The same reference numbers are given to similar structures and descriptions thereof are omitted. In other words, a configuration in which the protector 60 in FIG. 1 is substituted for the protector 260 of FIG. 10 is the wire harness routing structural part according to the second embodiment.

The different path guide part 282 is formed along a vehicle interior-side lateral portion of the extra length absorption portion 62. Of a first member 276 and a second member 278 configuring the protector 260, the different path guide part 282 is formed on the second member 278 in a shape projecting toward the vehicle interior from the outer surface of the extra length absorption portion 62. FIG. 10 shows the trench-shaped different path guide part 282 opening toward the vehicle interior. The different path guide part 282 is formed in a trench shape having a pair of side walls rising from the outer surface of the extra length absorption portion 62 on the second member 276, leaving a space where the different path wire 3 can be installed, and having a portion of the extra length absorption portion 62 as a bottom portion of the trench shape. In other words, the second member 278 of the protector 260 has a shape in which the pair of side walls rise from the outer surface of the second member 78 on the protector 60 according to the first embodiment and in which the lid-shaped portion 88 is omitted. Meanwhile, the first member 276 has a shape in which the trench-shaped portion 86 is omitted on the first member 76 of the protector 60 according to the first embodiment. Herein, the different path guide part 282 is formed in a shape extending in substantially a straight line shape on the outer surface of the extra length absorption portion 62 from a position adjacent to the extraction opening 64 toward the connection location 99 of the speaker 98.

Figure 11:
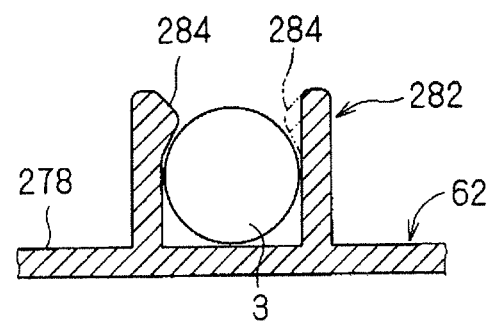
[FIG. 11] a cross-sectional view along a line XI-XI in FIG. 10.

The different path guide part 282 may also include a retention portion 284 inhibiting escape of the different path wire 3 installed in the interior thereof (see FIG. 11). Moreover, the retention portion 284 may be formed so as to project from a first side wall of the different path guide part 282 (the retention portion 284 shown in a solid line in FIG. 11) and may also be formed so as to project from a second side wall (the retention portion 284 shown in a two-dot-dashed line in FIG. 11). In addition, a configuration for fixating the different path wire 3 can also be provided to a speaker 98-side end portion of the different path guide part 282.

However, a different path guide part may also be configured by a portion of the extra length absorption portion 62 on a second member and a portion projecting therefrom in substantially an "L" shape in a cross-sectional view, and may be formed in a trench shape opening in a direction orthogonal to the vehicle interior-exterior direction.

Also, the different path guide part may be formed in a shape guiding the different path wire 3 along the outer surface of the extra length absorption portion 62 by displacing the different path wire 3 from a path along a rear side of the extra length absorption portion 62 to a path along the vehicle interior side of the extra length absorption portion 62.

According to the wire harness routing structural part according to the second embodiment, the different path guide part 282 is formed along a vehicle interior-side lateral portion on the extra length absorption portion 62, and therefore an increase in the dimensions of the protector 260 to the rear side of the door 20 can be inhibited. The different path guide part 282 can thus be applied even in a case with strict restrictions on space on the rear side of the extra length absorption portion 62 on the interior of the door 20.

In addition, the different path guide part 282 is formed along the vehicle interior-side lateral portion of the extra length absorption portion 62, and thus in a lateral view of the door 20, the different path wire 3 can be routed traversing the extra length absorption portion 62 in substantially a straight line shape. Thereby, the different path wire 3 can be routed on a shorter path to the electrical devices such as the speaker 98 positioned below the protector 60.

The wire harness routing structural part 30 was described in detail above; however, the above description is in all respects illustrative and the present invention is not limited thereto. Numerous modifications not named as examples are understood to be conceivable without deviating from the scope of the present invention.

DESCRIPTION OF REFERENCE NUMERALS

1 Wire harness
2 Main path wire
3 Different path wire
10 Body
20 Door
30 Wire harness routing structural part
60, 160, 260 Protector
62 Extra length absorption portion
64 Extraction opening
76, 276 First member
82, 182, 282 Different path guide part
84, 284 Retention portion
86, 186 Trench-shaped member
98 Speaker
99 Connection location

The invention claimed is:

1. A wire harness routing structural part routing a wire harness between a body and a door of a vehicle, the wire harness routing structural part comprising:
   a wire harness configured such that a portion thereof is fixated to the body and including a main path wire and a different path wire routed on a path different from a path of the main path wire; and
   a protector positioned on the interior of the door, the protector comprising:
      an accommodation part having an extraction opening for extraction of the wire harness to the interior of the door and accommodating the wire harness with a space enabling the wire harness to be redirected; and
      a different path guide part guiding the different path wire of the wire harness extracted through the extraction opening on a path following an outer surface of the accommodation part, the path being different from the path of the main path wire of the wire harness, wherein
   the different path wire is branched off from the main path wire in the wire harness extracted from the extraction opening, U-turned and returned inside the extraction opening, and positioned in the different path guide part.

2. The wire harness routing structural part according to claim 1, wherein the different path guide part forms a path along a rear side of the accommodation part.

3. The wire harness routing structural part according to claim 1, wherein the accommodation part includes a path regulating wall configured to constrain a path to a path that bends the wire harness toward the extraction opening by abutting the wire harness, and
   the different path guide part is formed along an outer surface of the path regulating wall.

4. The wire harness routing structural part according to claim 1, wherein the different path guide part forms a path following a vehicle interior side of the accommodation part.

5. The wire harness routing structural part according to claim 1, wherein the different path guide part includes a rib-shaped wall rising up with respect to the outer surface of the accommodation part.

6. The wire harness routing structural part according to claim 1, wherein the protector is positioned on the interior of the door in an orientation where the extraction opening faces upwards, and
   the different path guide part is configured to guide the different path wire on a path directed downward from the extraction opening.

7. The wire harness routing structural part according to claim 1, wherein the protector is configured by assembling a recessed member and a lid-shaped member, and
   the different path guide part includes a trench-shaped portion formed on the recessed member.

8. The wire harness routing structural part according to claim 7, wherein the different path guide part includes a retention portion engaging with the different path wire installed in an interior of the trench-shaped portion.

9. The wire harness routing structural part according to claim 1, wherein the U-turned portion of the different path wire defines a loop in the different path wire, and wherein the loop is positioned at the extraction opening.

* * * * *